C. H. ORCUTT.
Machine for Skiving Counter-Stiffeners for Boots and Shoes.
No. 159,606.    Patented Feb. 9, 1875.
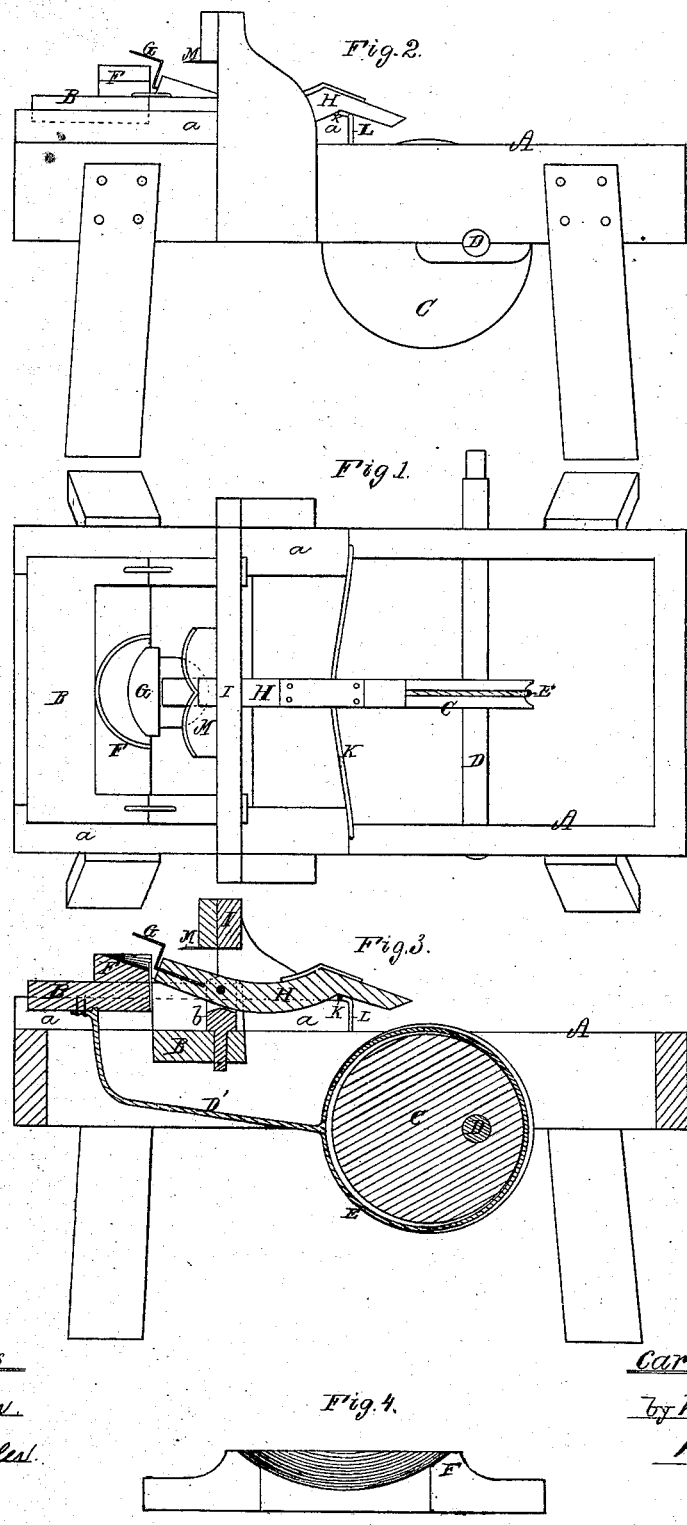

UNITED STATES PATENT OFFICE.

CHARLES H. ORCUTT, OF LEOMINSTER, ASSIGNOR TO JOSEPH A. HARWOOD, OF LITTLETON, AND NAHUM HARWOOD, OF LEOMINSTER, MASS.

IMPROVEMENT IN MACHINES FOR SKIVING COUNTER-STIFFENERS FOR BOOTS AND SHOES.

Specification forming part of Letters Patent No. 159,606, dated February 9, 1875; application filed January 23, 1875.

*To all whom it may concern:*

Be it known that I, CHARLES H. ORCUTT, of Leominster, in the county of Worcester and State of Massachusetts, have invented a new and useful Machine for Making Skived Counters for Boots or Shoes; and do hereby declare the same to be fully described in the following specification, and represented in the accompanying drawings, in which—

Figure 1 is a top view, Fig. 2 a side elevation, and Fig. 3 a longitudinal section, of said machine. Fig. 4 is an inner side view of its concave bed-die or former.

My invention consists in the combination of a concave bed-die or former, a movable counter or fellow die, and a knife, all arranged in manner, and provided with operative mechanism, essentially as hereinafter specified; the object of the invention being to cut from a piece or strip of leather, leather-board, or other suitable sheet material, one or more counters or heel-stiffeners, skived or chamfered along the curved edge of each.

In such drawings, A denotes the frame of the machine, having applied to it a carriage, B, duly supported by parallel guides *a a*, so as to be capable of being moved back and forth rectilinearly, such movements being effected by an eccentric, C, fixed to a driving-shaft, D, and connected with the carriage by a collar, E, and a rod, D', extending from said collar and jointed to the carriage. On this carriage is fixed the die or former F, which is semi-elliptical, or thereabout, in shape, and concave, as shown. A presser, G, or counter-die, operates with the said former, such presser being fixed to a bent lever, H, pivoted to a standard, *b*, erected on the carriage. The longer arm of the lever H overrides a bar, I, extending across the frame A. In rear of the former F there projects across the frame an arch or bar, K, supported by standards L L, arranged as represented. To this bar, and on or about on a level with the top of the former F, a horizontal knife, M, is fixed.

On placing a piece of leather or leather-board upon the former F, and between it and the presser or counter-die G, and moving the carriage in a direction toward the knife, so as to carry the entire former F under such knife, the lever H will be moved against the bar I in a manner to cause the presser G to be depressed upon the piece of material, and crowd such down into the former F, and hold it therein during the period the dies may be passing under the knife. While the material held by the dies and bent down by them so passes under the knife, the latter will cut from that portion of it within the former F all the portion extending above it, and in so doing will form the piece between the dies into a counter skived along its curved or arcal edge.

By such a machine a strip of leather or leather-board may be readily reduced or cut into skived counters, it, in order to economize stock, being turned over or upside down after each counter may have been cut from it.

I would observe that the former and the counter-dies, instead of being movable toward and under the knife, may have such knife provided with mechanism to move it over them, in order to cause it to cut through the sheet of material when held by the said former and counter-die.

I claim—

In a machine for forming and skiving heel-stiffeners or counters for boots or shoes, the concave former F, counter-die G, and knife M, in combination with mechanism for depressing the counter-die into the former, and for moving both die and former underneath the knife, or the latter over both former and counter-die, substantially as and for the purpose described.

CHARLES H. ORCUTT.

Witnesses:
JAMES BENNETT,
D. ANN BENNETT.